US008035962B2

(12) United States Patent
Lee

(10) Patent No.: US 8,035,962 B2
(45) Date of Patent: Oct. 11, 2011

(54) COMPUTER HOT-PLUG STRUCTURE

(75) Inventor: Andrew Lee, Fremont, CA (US)

(73) Assignee: Antec, Inc., Fremont, CA (US)

( * ) Notice: Subject to any disclaimer, the term of this patent is extended or adjusted under 35 U.S.C. 154(b) by 0 days.

(21) Appl. No.: 12/716,703

(22) Filed: Mar. 3, 2010

(65) Prior Publication Data

US 2011/0216499 A1    Sep. 8, 2011

(51) Int. Cl.
*G06F 1/16* (2006.01)
(52) U.S. Cl. ........... 361/679.37; 361/679.33; 361/679.6; 361/724; 312/223.1; 312/223.2; 369/75.11
(58) Field of Classification Search ............. 361/679.33, 361/679.37
See application file for complete search history.

(56) References Cited

U.S. PATENT DOCUMENTS

| | | | | |
|---|---|---|---|---|
| 4,853,807 A | * | 8/1989 | Trager | 360/97.01 |
| 5,169,218 A | * | 12/1992 | Chu | 312/223.2 |
| 5,184,282 A | * | 2/1993 | Kaneda et al. | 361/737 |
| 5,211,459 A | * | 5/1993 | Wu | 312/223.2 |
| 5,253,133 A | * | 10/1993 | Guo | 360/97.01 |
| 5,363,273 A | * | 11/1994 | Ma | 361/679.37 |
| 5,547,272 A | * | 8/1996 | Paterson et al. | 312/223.2 |
| 5,768,163 A | * | 6/1998 | Smith, II | 708/105 |
| 5,913,926 A | * | 6/1999 | Anderson et al. | 714/6 |
| 6,049,452 A | * | 4/2000 | You et al. | 361/679.37 |
| 6,058,089 A | * | 5/2000 | Youens et al. | 720/652 |
| 6,185,103 B1 | * | 2/2001 | Yamada | 361/727 |
| 6,233,147 B1 | * | 5/2001 | Hunter | 361/690 |
| 6,361,372 B1 | * | 3/2002 | Chiang | 439/680 |
| 6,407,910 B1 | * | 6/2002 | Diaz et al. | 361/679.37 |
| 6,580,603 B1 | * | 6/2003 | Resnick | 361/679.59 |
| 6,621,715 B2 | * | 9/2003 | Kitadai | 361/801 |
| 6,648,429 B2 | * | 11/2003 | Chen et al. | 312/223.2 |
| 6,798,651 B2 | * | 9/2004 | Syring et al. | 361/679.34 |
| 6,947,280 B2 | * | 9/2005 | Li | 361/679.46 |
| 7,019,961 B2 | * | 3/2006 | Misawa | 361/679.32 |
| 7,035,095 B2 | * | 4/2006 | Frame et al. | 361/679.32 |
| D523,861 S | * | 6/2006 | Li et al. | D14/444 |
| 7,281,936 B2 | * | 10/2007 | Reents et al. | 439/248 |
| 7,375,959 B2 | * | 5/2008 | Chang | 361/679.33 |

(Continued)

FOREIGN PATENT DOCUMENTS

| TW | M300318 | 11/2006 |
|---|---|---|
| TW | M370277 | 12/2009 |

*Primary Examiner* — Jinhee Lee
*Assistant Examiner* — Anthony Q Edwards
(74) *Attorney, Agent, or Firm* — Muncy, Geissler, Olds & Lowe, PLLC

(57) ABSTRACT

A computer hot-plug structure allows a hard disk to be connected to a computer in a hot-plug fashion. The computer has a casing and a plurality of side panels surrounding various sides of the casing. Each side panel has a thread-hole and a hood covering the thread-hole. The hood has a top portion and two flanks at two ends of the top portion to form a housing space for plugging and unplugging of the hard disk. The housing space has one end formed an insertion slot to receive the hard disk and a hot-plug connector at another end. The hot-plug connector has a first connection port connected to the hard disk and a second connection port electrically connected to the computer through a transmission line passing through the thread-hole. Thus the hard disk is held on the outer side of the computer to save the interior space of the computer.

12 Claims, 4 Drawing Sheets

U.S. PATENT DOCUMENTS

| | | | |
|---|---|---|---|
| 7,458,145 B2 * | 12/2008 | Kaply et al. | 29/830 |
| 7,509,508 B2 * | 3/2009 | Chen | 713/300 |
| 7,554,800 B2 * | 6/2009 | Bragg | 361/679.58 |
| 2003/0151891 A1 * | 8/2003 | Paul | 361/686 |
| 2007/0070595 A1 * | 3/2007 | Chen et al. | 361/685 |
| 2007/0270026 A1 * | 11/2007 | Lo | 439/499 |

* cited by examiner

COMPUTER HOT-PLUG STRUCTURE

FIELD OF THE INVENTION

The present invention relates to a computer hot-plug structure and particularly to a computer hot-plug structure to allow a hard disk to be connected to a computer host.

BACKGROUND OF THE INVENTION

In recent years, computers become very popular, and their benefits are enjoyed by many people. To meet the greater demand of providing portability for huge amount of computer data, many types of external hard disks have been developed and made available on the market. Most of them adopt hot-plug technique. Hot-plug means that the peripheral devices of the computer can be plugged or unplugged without turning off power supply and also without causing burn-out of the host or the peripheral devices, and new devices can be instantly detected and employed to offer greater usability.

For instance, R.O.C. patent No. M300318 discloses a computer casing with an external SATA hard disk interface. The computer casing has a SATA interface hard disk connector at a desired location to establish electric connection between a hard disk and a computer. The hard disk is located outside the computer casing and connected to the SATA interface hard disk connector through a transmission line. The hard disk is not held or supported by any means, hence is prone to be impacted or dropped, or inadvertently drawn and disconnected with the computer casing, and results in data loss.

R.O.C. patent No. M370277 also discloses a host casing equipped with a hard disk hot-plug apparatus. The casing has an orifice formed on a front panel, upper cover or any side panel. A hard disk coupling box is provided and held in the orifice. The hard disk coupling box has an opening corresponding to the orifice, and a hot-plug connector is provided thereon. The hot-plug connector is coupled with a power cord and a SATA cable connecting to a motherboard. By inserting the hard disk into the hard disk coupling box, the hard disk can be connected to the computer through the hot-plug connector, and is also securely held in the hard disk coupling box.

In R.O.C. patent No. M370277, the hard disk coupling box is held inside the casing, and the orifice formed on the side panel of the casing aims to receive the hard disk. When in use, the hard disk is inserted into the interior of the casing. Such an approach interferes with the existing electronic devices in the casing. Positioning of the electronic devices becomes a big concern. The hard disk coupling box also occupies a great portion of the interior space of the casing and causes internal space constraint of the casing.

SUMMARY OF THE INVENTION

The primary object of the present invention is to solve the aforesaid disadvantages to couple a hard disk with a computer through a hot-plug fashion without occupying the interior space of the computer and to spare sufficient interior space thereof.

To achieve the foregoing object, the present invention provides a computer hot-plug structure. The computer includes a casing and a plurality of side panels surrounding various sides of the casing. One of the side panels has a thread-hole and a hood connected to the side panel covering the thread-hole. The hood has a top portion and two flanks at two ends of the top portion to form a housing space for plugging and unplugging of a hard disk. The housing space has one end formed an insertion slot to receive the hard disk and a hot-plug connector at the other end. The hot-plug connector has a first connection port connecting to the hard disk and a second connection port connecting electrically to the computer through a transmission line penetrating the thread-hole.

Another object of the invention is to form modular configuration of connection ports on the computer panel.

In an embodiment of the invention, a support rack is provided between the hood and the side panel to form a holding space corresponding to the panel to hold at least one connection port. The panel has a coupling hole corresponding to the connection port. The connection port may be a signal connection port, a power connection port, a power and signal connection port, etc.

By means of the structure set forth above, the invention can achieve optimal utilization of the interior space of the computer.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
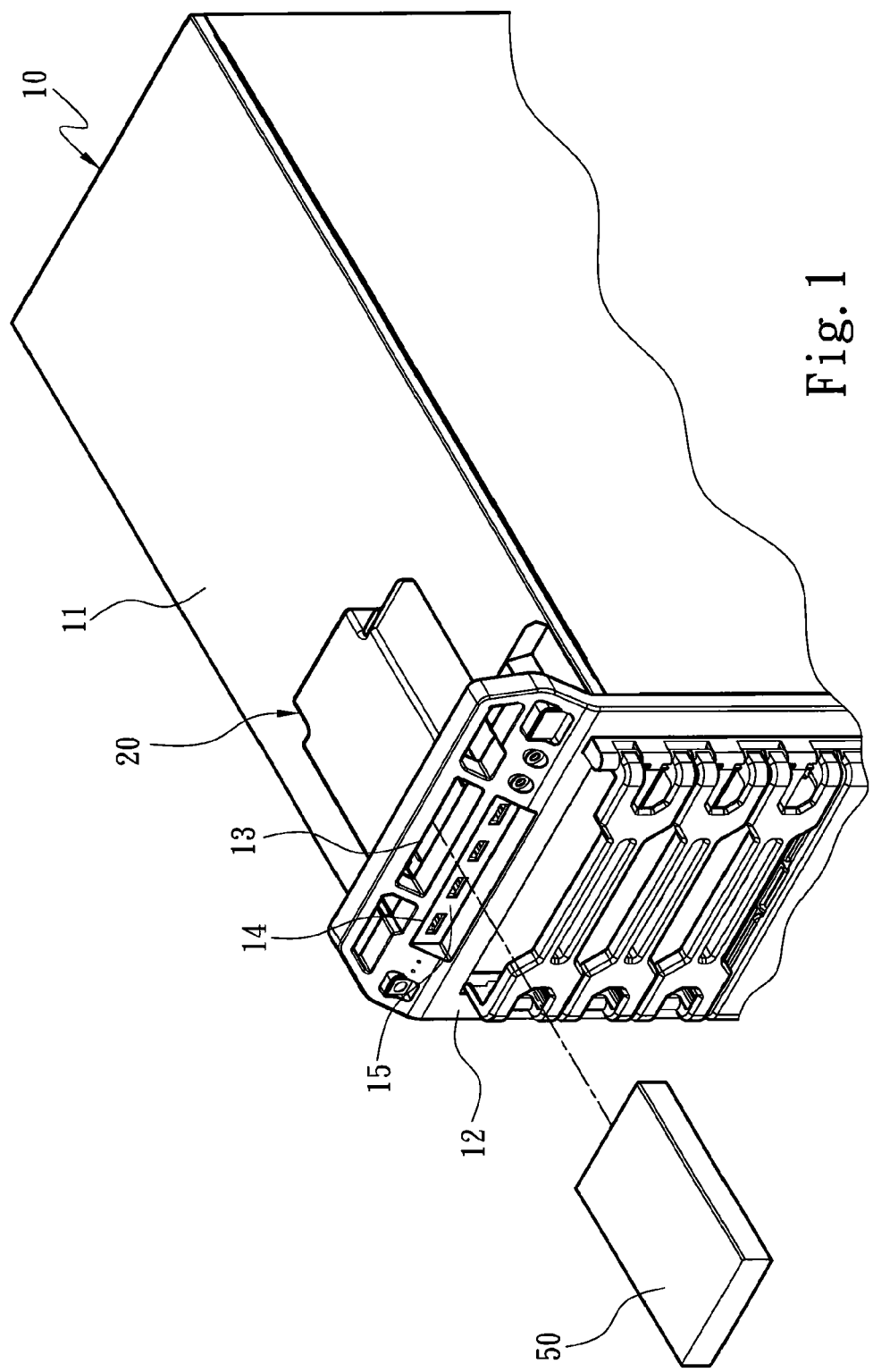
FIG. 1 is a perspective view of the invention.
Figure 2:
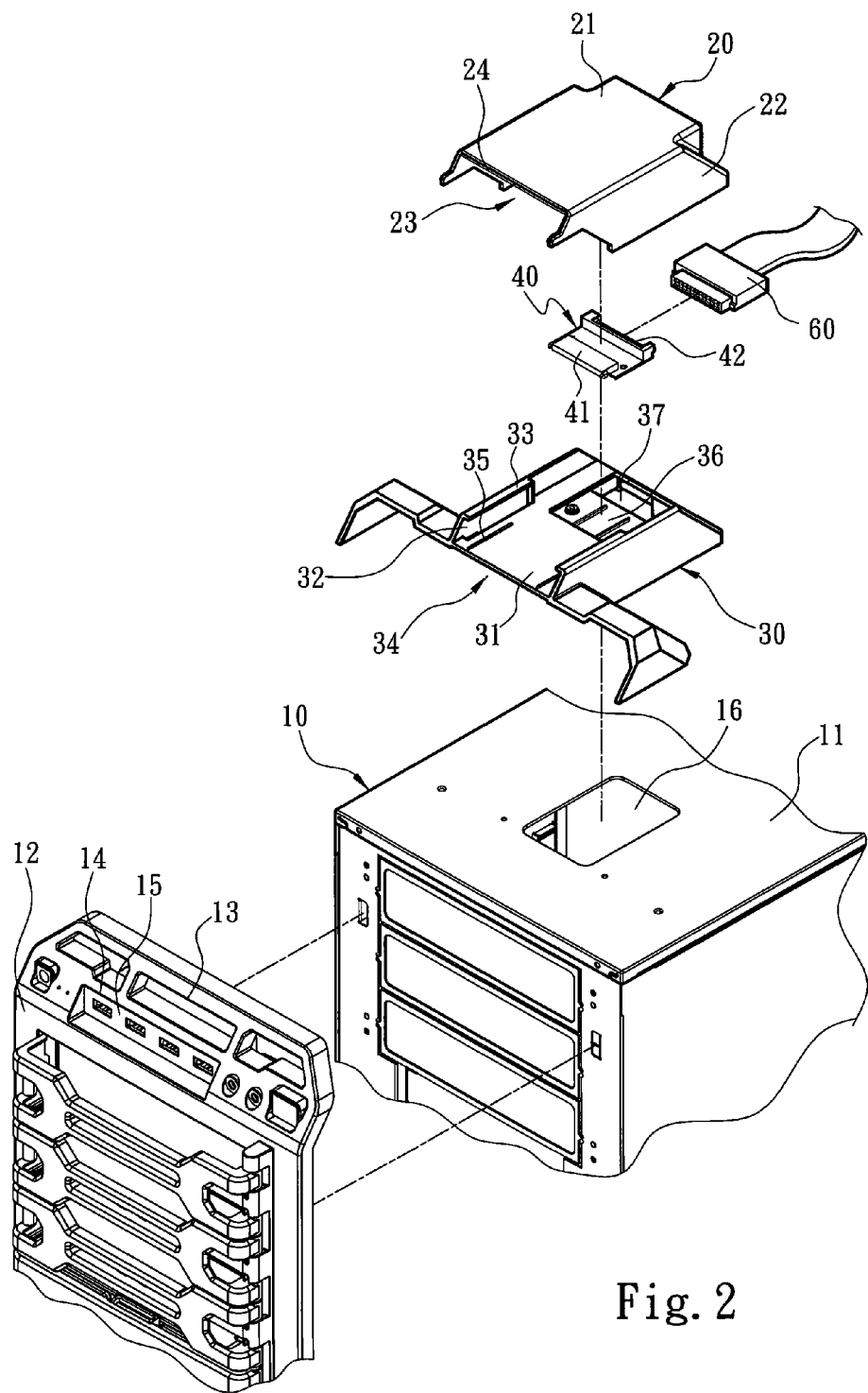
FIG. 2 is an exploded view of the invention.

Please refer to FIGS. 1 and 2, the computer hot-plug structure according to the invention aims to allow a hard disk 50 to be coupled with a computer 10 in a hot-plug fashion. It mainly comprises the computer 10 and a hood 20 located on the computer 10. The computer 10 has a casing with a panel 12 at the front side and a plurality of side panels 11 surrounding various sides of the casing. One of the side panels 11 has a thread-hole 16 formed thereon and covered by the hood 20. The hood 20 also has a top portion 21 and two flanks 22 at two ends of the top portion 21. The hood 20 and the computer 10 are interposed by a support rack 30. The support rack 30 has two guiding plates 32 located between and connected to the two flanks 32, and the two guiding plates 32 are spaced from each other at a width about the same as the width of the hard disk 50. The support rack 30 and the computer 10 form a holding space 34 between them to hold at least one connection port 15 (such as a signal connection port, a power connection port, a power and signal connection port, etc.). The panel 12 has a coupling hole 14 corresponding to the connection port 15. The support rack 30 and the top portion 21 and two flanks 22 of the hood 20 also form a housing space 23 between them to hold the hard disk 50 in a hot-plug fashion. Moreover, the support rack 30 has a notch 37 to allow the housing space 23 to communicate with the holding space 34. The housing space 23 has one end formed an insertion slot 24 to receive the hard disk 50. The panel 12 has an insertion hole 13 corresponding to the insertion slot 24. The support rack 30 further has an installation portion 36 in the housing space 23 to hold a hot-plug connector 40. The hot-plug connector 40 has a first connection port 41 connecting to the hard disk 50 and a second connection port 42 electrically connected to the first connection port 41. The first and second connection ports 41 and 42 are eSATA connectors. The second connection port 42 can be electrically connected to the computer 10 through a transmission line 60 passing through the thread-hole 16. Thus forms the main structure of the invention.

Figure 3:
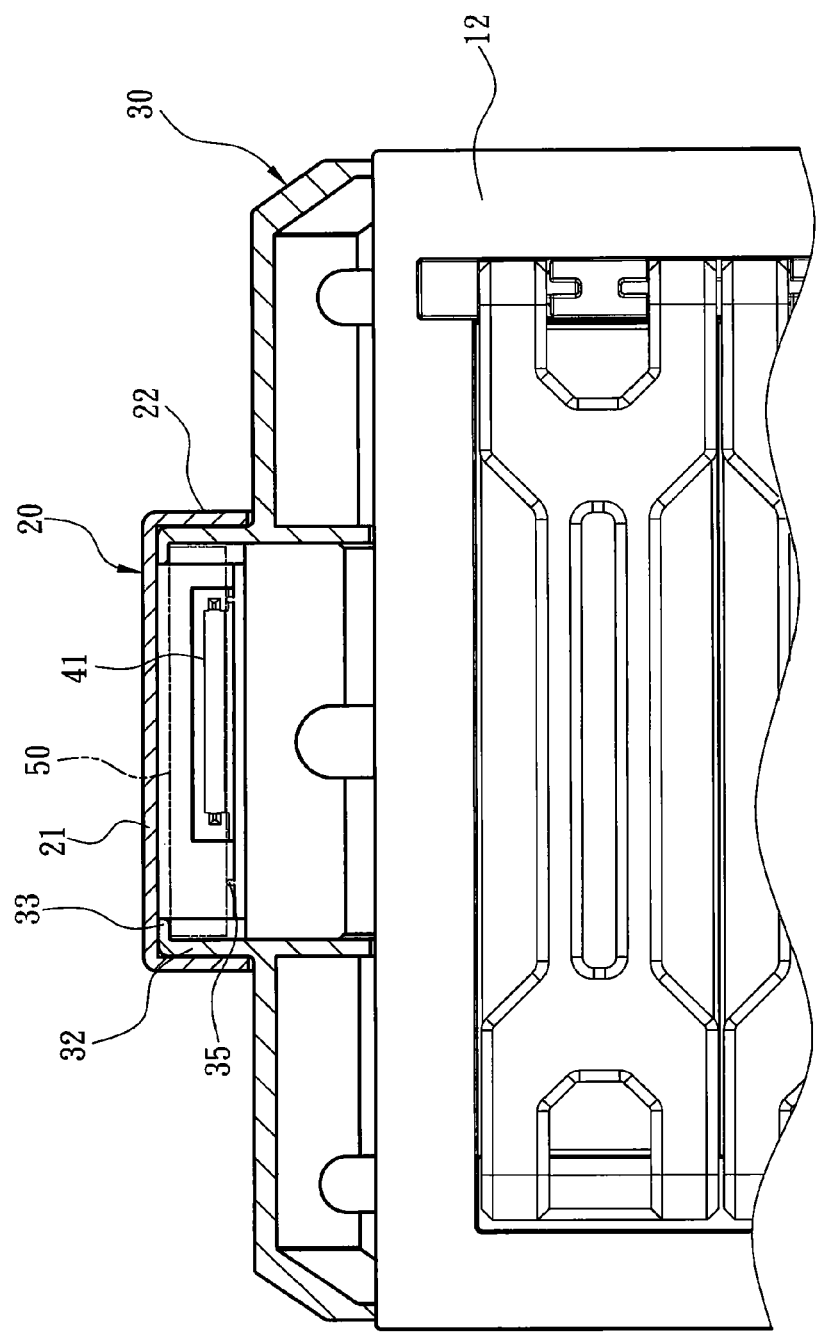
FIG. 3 is a sectional view of the invention.
Figure 4:
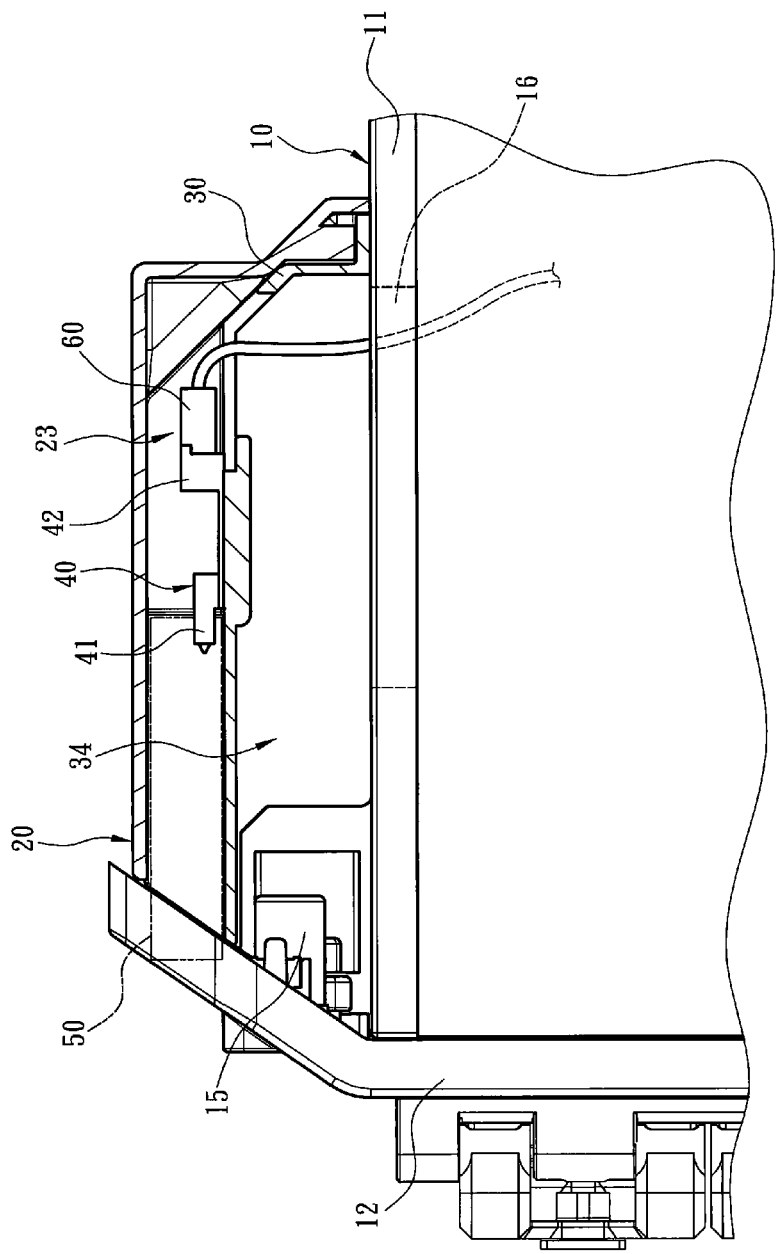
FIG. 4 is another sectional view of the invention.

As the hood 20 covers the outer side of one side panel 11 of the computer 10 to form the housing space 23 to receive the hard disk 50 in the hot-plug fashion, the hard disk 50 can be inserted and anchored on the outer side of the computer 10 to save the interior space thereof. Moreover, the connection ports 15 on the panel 12 can be integrated and positioned in the holding space 34 formed by the support rack 30. In addition to saving space, a modular configuration can be formed. Furthermore, in order to facilitate air ventilation of the hard disk 50 held in the housing space 23 of the hood 20, referring to FIGS. 3 and 4, each of the guiding plates 32 of the support rack 30 has one edge bent to form an anchor portion 33 to hold the hard disk 50. The housing space 23 also has a bearing surface 31 to carry the hard disk 50. The bearing surface 31 has a support portion 35 to support the hard disk 50. The support portion 35 shown in the drawings may be a jutting rib on the support rack 30. Hence when the hard disk 50 is inserted into the housing space 23, it is clamped by the guiding plates 32 at two sides and forms a gap at the bottom because of the support portion 35, and the hard disk 50 has the top spaced from the top portion 21 of the hood 20 through the anchor portion 33. Thereby the hard disk 50 has a greater area at the top and bottom in contact with air to facilitate air ventilation to improve heat dissipation of the hard disk 50.

As a conclusion, the computer 10 of the invention mainly has a thread-hole 16 on one of the side panels 11, and a hood 20 on the outer side of the side panel 11 covering the thread-hole 16. The hood 20 has a top portion 21 and two flanks 22 at two ends of the top portion 21 to form a housing space 23 to hold the hard disk 50 in a hot-plug fashion. The housing space 23 has one end formed an insertion slot 24 to receive the hard disk 50 and a hot-plug connector 40. The hot-plug connector 40 has a first connection port 41 connected to the hard disk 50 and a second connection port 42 electrically connected to the first connection port 41. The second connection port 42 is electrically connected to the computer 10 through a transmission line 60 passing through the thread-hole 16. By positioning the hood 20 on the outer side of the side panel 11 of the computer 10, the hard disk 50 can be held outside the computer 10 without occupying the interior space thereof to save space of the computer 10 to improve usability.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A computer hot-plug structure, comprising:
   a computer which includes a casing and a plurality of side panels surrounding various sides thereof, one of the side panels including a thread-hole; and
   a hood which is coupled on an outer side of the side panel corresponding to the thread-hole and includes a top portion and two flanks at two ends of the top portion to form a housing space to hold a hard disk in a hot-plug fashion; the housing space including one end forming an insertion slot to receive the hard disk and a hot-plug connector at the other end, the hot-plug connector including a first connection port connected to the hard disk and a second connection port electrically connected to the computer through a transmission line passing through the thread-hole;
   wherein the hood and the side panel are interposed by a support rack, including, an installation portion to hold the hot-plug connector, which forms the housing space with the hood and also forms a holding space with the side panel.

2. The computer hot-plug structure of claim 1, wherein the support rack includes a notch to allow the housing space to communicate with the holding space.

3. The computer hot-plug structure of claim 1, wherein the support rack includes two guiding plates connected to the two flanks to hold the hard disk.

4. The computer hot-plug structure of claim 3, wherein the two guiding plates are spaced from each other at a width substantially equal to the width of the hard disk.

5. The computer hot-plug structure of claim 3, wherein each of the guiding plates includes an anchor portion to hold the hard disk.

6. The computer hot-plug structure of claim 1, wherein the support rack includes a bearing surface in the housing space to carry the hard disk, the bearing surface includes a support portion to support the hard disk.

7. The computer hot-plug structure of claim 6, wherein the support portion is a jutting rib on the bearing surface.

8. The computer hot-plug structure of claim 1, wherein the casing includes a panel which includes an insertion hole corresponding to the insertion slot.

9. The computer hot-plug structure of claim 8, wherein the holding space includes at least one connection port and the panel includes a coupling hole corresponding to the connection port.

10. The computer hot-plug structure of claim 9, wherein the connection port is a signal connection port.

11. The computer hot-plug structure of claim 9, wherein the connection port is a power connection port.

12. The computer hot-plug structure of claim 9, wherein the connection port is a power and signal connection port.

* * * * *